US006966108B2

(12) United States Patent
Sato et al.

(10) Patent No.: US 6,966,108 B2
(45) Date of Patent: Nov. 22, 2005

(54) WRAP-AROUND NOTEBOOK TECHNIQUE

(75) Inventors: Jay K. Sato, Mission Viejo, CA (US); Paul Whaley, Herculaneum, MO (US); James Gregory Lane, Meridian, MS (US)

(73) Assignee: Avery Dennison Corporation, Pasadena, CA (US)

( * ) Notice: Subject to any disclaimer, the term of this patent is extended or adjusted under 35 U.S.C. 154(b) by 44 days.

(21) Appl. No.: 10/704,300

(22) Filed: Nov. 6, 2003

(65) Prior Publication Data

US 2005/0097732 A1 May 12, 2005

(51) Int. Cl.[7] ................................................ B23P 19/00
(52) U.S. Cl. .......................... 29/798; 29/822; 29/33 K; 29/795; 29/810; 29/281.1; 29/243.53; 412/9; 402/80 R
(58) Field of Search .................... 29/13, 237.5, 243.53, 29/243.57, 243.58, 281.1, 33 K, 793, 795, 29/798, 810, 822; 412/9, 38, 22; 402/80 R, 402/31, 34

(56) References Cited

U.S. PATENT DOCUMENTS

| | | | | | |
|---|---|---|---|---|---|
| 1,255,112 | A | * | 1/1918 | Crippen | 29/237.5 |
| 1,424,753 | A | * | 8/1922 | Crippen | 29/237.5 |
| 5,100,253 | A | * | 3/1992 | Cooper | 402/75 |
| 5,160,209 | A | * | 11/1992 | Schuessler | 402/75 |
| 5,249,902 | A | * | 10/1993 | Stankiewicz | 412/7 |
| 5,649,799 | A | * | 7/1997 | Constantine et al. | 412/19 |
| 5,651,628 | A | * | 7/1997 | Bankes et al. | 402/73 |
| 6,007,266 | A | * | 12/1999 | Cheng et al. | 402/36 |
| 6,168,338 | B1 | | 1/2001 | Young | |

* cited by examiner

*Primary Examiner*—Essama Omgba
(74) *Attorney, Agent, or Firm*—Scott R. Hansen; Fulwider Patton Lee & Utecht LLP

(57) ABSTRACT

A system for assembling a wrap-around type binder includes a riveting apparatus including a riveting station, for assembling a ring/shield/frame/hinge plate assembly to binder covers. The ring assemblies are moved to the riveting station along one path, and the binder or notebook covers are fed to the riveting station along another path. The riveting station includes locating and forming pins and at least one magnet for holding the hinge plates, and a carriage for holding rivets and for driving them through the covers and expanding the rivets on the forming pins to securely mount the hinge plates and associated rings, shields and frames to the binder covers.

21 Claims, 11 Drawing Sheets

WRAP-AROUND NOTEBOOK TECHNIQUE

RELATED APPLICATIONS

This specification is related to U.S. patent application Ser. No. 10/633,283, entitled Improved Wrap-Around Notebook, filed Aug. 1, 2003.

FIELD OF THE INVENTION

This invention relates to the securing of paper retention rings into a binder.

BACKGROUND OF THE INVENTION

Paper retention ring sub-assemblies are conventionally riveted into a binder, either to the spine of the binder or to one of the binder covers adjacent to the spine. In the case of "Wrap-Around" notebooks or binders, however, as shown in U.S. Pat. No. 6,168,338 and in the above-identified patent application, the paper retaining ring sub-assembly is provided with a hinge plate to which a ring sub-assembly is pivotally mounted. It is, however, difficult to hold the ring sub-assembly and hinge plate firmly in place to permit consistent riveting of the hinge plate to the binder.

SUMMARY OF THE INVENTION

In accordance with one illustrative embodiment of the present invention, the hinge plates are mounted to the ring sub-assemblies with the plane of the hinge plates aligned with the top or bottom of the ring sub-assembly to insure controlled feeding of the hinge plate and ring assembly to the riveting location. In addition, the hinge plate may be magnetically held in a fixed position as the hinge plate is riveted to the binder or notebook. In accordance with another feature, arrangements may be provided for holding the hinge plate aligned with the ring subassembly. This may include a tape or the like for securing the hinge plate at a fixed angle relative to the ring assembly, or a fixture for raising the hinge plate into alignment with the ring assembly as the assembly arrives at the riveting station.

In practice, the ring and hinge plate assemblies are fed to a riveting station, and the notebook or binder covers are concurrently moved to the riveting station along a different path; and the riveting station is provided with magnetic holding arrangements to assure proper alignment of hinge plate to the notebook during riveting.

It is further noted that, in the course of riveting the hinge plate to the binder, the ring/shield/frame sub-assembly may be pivoted relative to the hinge plate, to allow clearance for the binder to remain open and flat during the riveting step.

Through the use of the foregoing steps, the assembly of the wrap-around binder may be accomplished using substantially the same basic equipment as is employed in the assembly of conventional three ring binders, with modification as discussed herein.

Other objects, features and advantages of the invention will become apparent from a consideration of the following detailed description and from the accompanying drawings.

Before entering into a description of the drawings and a detailed description of an illustrative embodiment of the invention, it is noted that the present invention is closely related to the invention described in the "Related Application" cited hereinabove. For completeness, the drawings of that specification are included into this specification as FIGS. 1–9 along with the associated detailed description of these nine figures.

BRIEF DESCRIPTION OF THE PREFERRED EMBODIMENTS

While the specification describes particular embodiments of the present invention, those of ordinary skill can devise variations of the present invention without departing from the inventive concept.

It is again noted that FIGS. 1–9 of the drawings are from the prior related application cited above; and the detailed description from that application will be included below.

Initially, however, it is noted that a definition of terms is useful. Specifically, relative to the ring mounting sub-assembly, the ring mechanism normally has three rings mounted so that there are two stable positions for the rings, with the rings being either open to facilitate insertion or removal of sheets of paper, or closed to hold the sheets in place. To obtain these two stable positions for the rings, an assembly is provided using two long stiff rectangular plates, known in the binder field as "frames". These two frames are pivotally coupled together along an inner longitudinal edge of each frame. A springy overlying metal strip known in the binder field as a "shield", engages the outer edges of the two strips and biases them inward to provide two bistable states for the frames, with the frames making an oblique angle relative to one another, with the central hinge line shifting in one direction for one of the stable positions, and in the opposite direction for the other stable position.

Now that certain key terms have been defined, the detailed description from the above case involving FIGS. 1–9 will be included in this specification following this paragraph.

Figure 1:
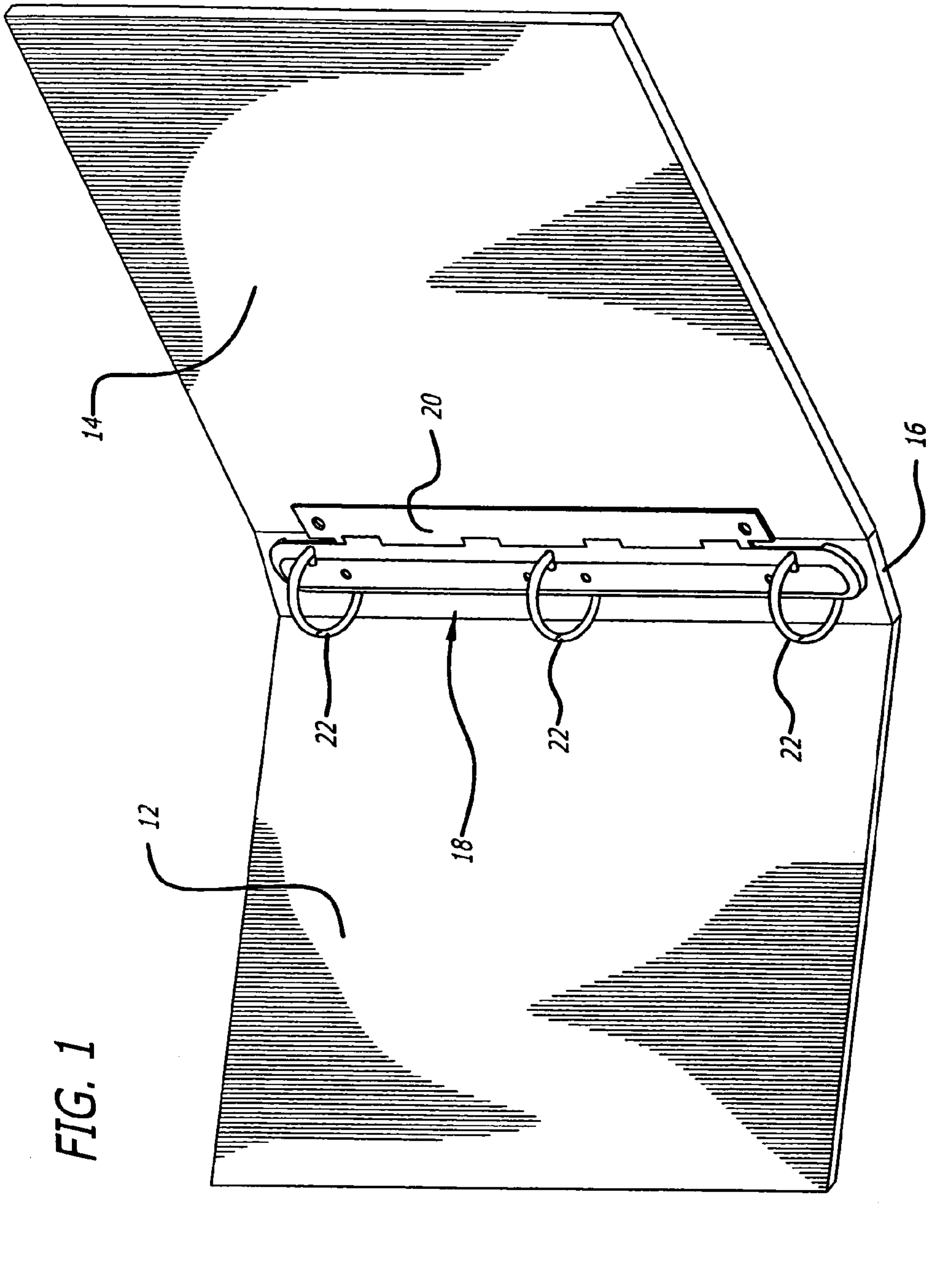
FIG. 1 shows a wrap-around binder with a ring and hinge plate assembly.

Referring more particularly to the drawings, FIG. 1 shows a notebook having two covers 12, 14 and a spine panel 16 hinged to the two covers. A ring assembly 18 is shown pivotally mounted to the notebook by the hinge panel 20. The rings 22, which may be opened or closed, are mounted on frames included in the ring assembly as discussed in greater detail hereinbelow.

Figure 2:
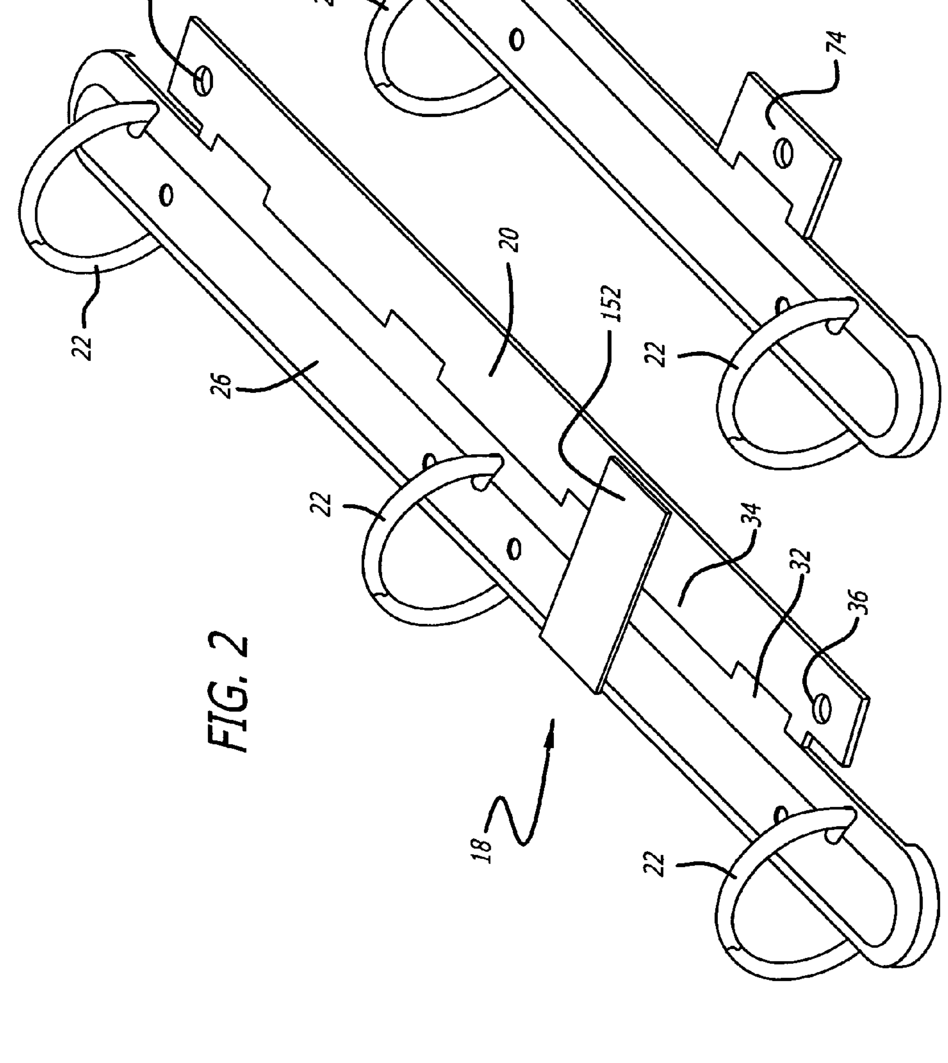
FIG. 2 is a perspective view, showing the ring assembly including the rings, the shield, and the hinge plate, with the frames being concealed by the shield.

FIG. 2 is a perspective view of the ring assembly 18 and the hinge plate 20. The pivot between the ring assembly 18 and the hinge plate 20 is implemented by alternate lateral extensions from the shield 26 and the hinge plate 20, which extensions are curled to have a central aligned opening through which a wire extends. The first curl from the shield 26 may be noted at reference numeral 32, and the first curl from the hinge plate may be noted at reference numeral 34.

The rivet holes 36 receive rivets to secure the hinge plate and ring assembly to the notebook.

Figure 3:
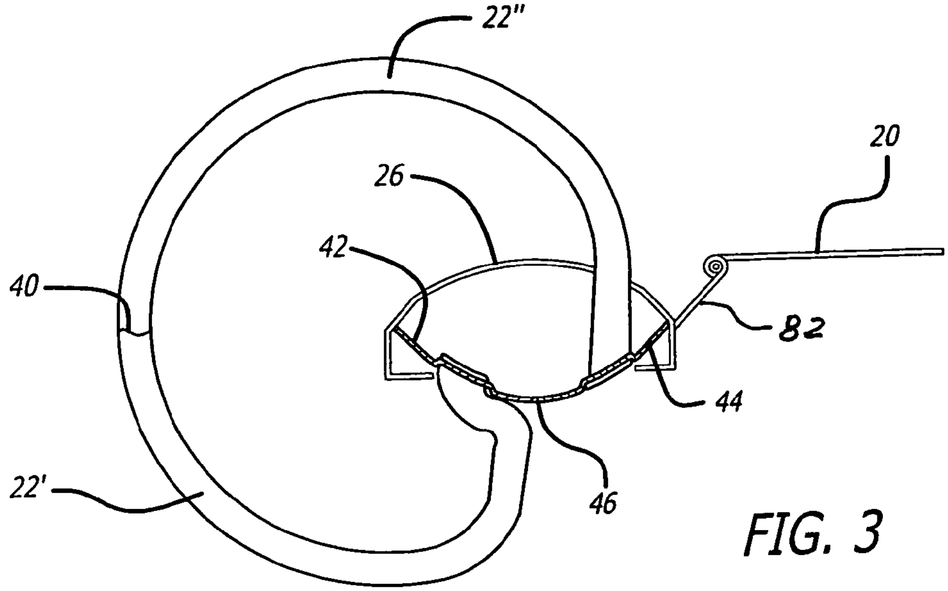
FIG. 3 is a partial cross-sectional view showing the curved frame members and with the rings in the closed position; and with the hinge plate aligned with the apex of the shield.

FIG. 3 is a partial cross-sectional view, showing the two half rings 22' and 22" which engage at the V-shaped junction 40. Also shown in FIG. 3 are the shield 26 and the hinge plate 20.

In operation, the two convexly curved frames 42 and 44 are pivotally coupled along line 46 in a conventional manner. The shield 26 is formed of springy, nickel-plated material, and exerts an inwardly directed biasing force on the outer edges of frames 42 and 44. The set of half rings 22" extend through clearance holes in the shield, and are secured to the upper side of frame 44 facing the shield. The other set of half rings 22' are secured to the bottom of frame 42, the side facing away from shield 26.

When the rings are opened, the pivot line 46 shifts upward, toward the shield 26, to the second bistable position.

In FIG. 3, the relative position of the upper surface of the hinge plate 20 relative to the shield 26 may be noted. Specifically, the upper surface of hinge plate 20 is aligned with the upper surface or apex of the shield 26 relative to the plane of shield 26 as defined by the lower edges thereof. With this configuration, the shield 26 and the upper surface of the hinge plate 20 will provide an even surface to help maintain the proper flat position of the hinge plate as the ring metal is fed through the riveting machine in which the hinge plate is riveted to the notebook.

Figure 4:
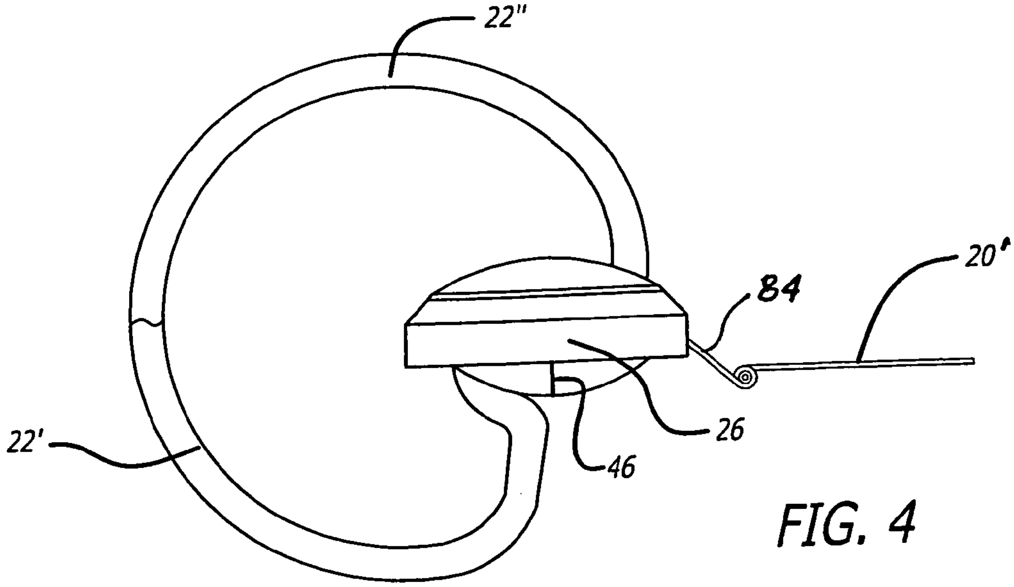
FIG. 4 is an end view showing the hinge plate extending outwardly from the ring assembly, and with the lower surface of the hinge plate aligned with the lower surface of the frames.

FIG. 4 is a view similar to FIG. 3, but with the lower surface of hinge plate 20' aligned with the lowermost surface of frames 42, 44. This facilitates the riveting of the hinge plate to the covers or spine panel of the notebook when a reverse riveted configuration of the ring/shield/frame assembly compared to FIG. 3 is desired with the bottom of the hinge plate 20' and the bottom of the frames 42, 44 engaging the guide surface to the riveting apparatus.

Figure 5:
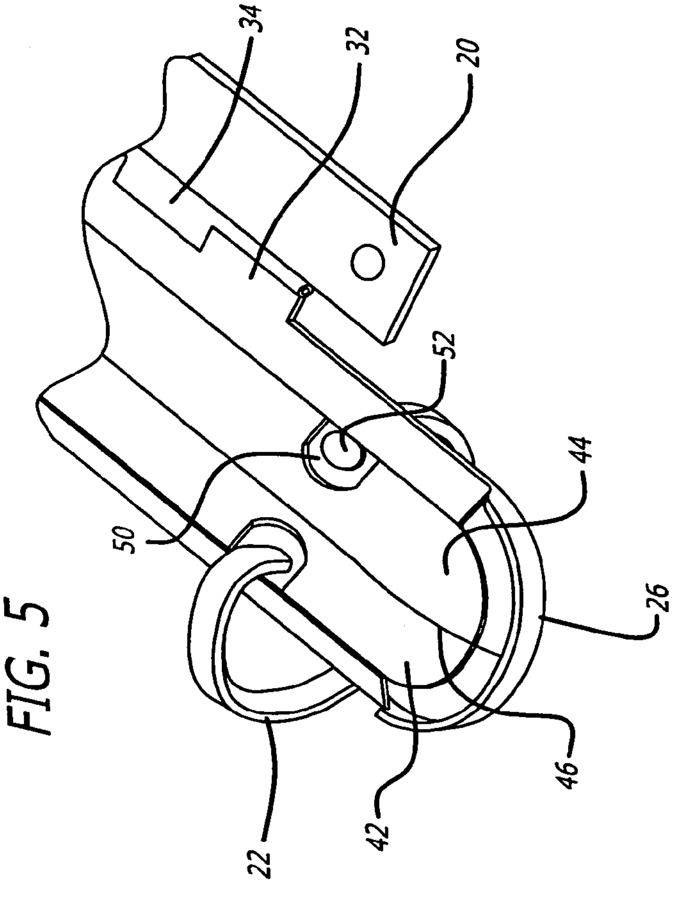
FIG. 5 is a perspective view of the bottom of one end of the ring assembly and the associated hinge plate.

FIG. 5 is a bottom view showing the frames 42, 44 and their pivot line 46. It may also be noted that recesses 50 are provided, with the rivet head 52 being formed in the recessed areas such as recess 50. In FIG. 5 the depending curved ends of the shield 26 are also visible. Also, the alternate curls 32 from the shield and 34 from the hinge plate may be seen to advantage.

Figure 6:
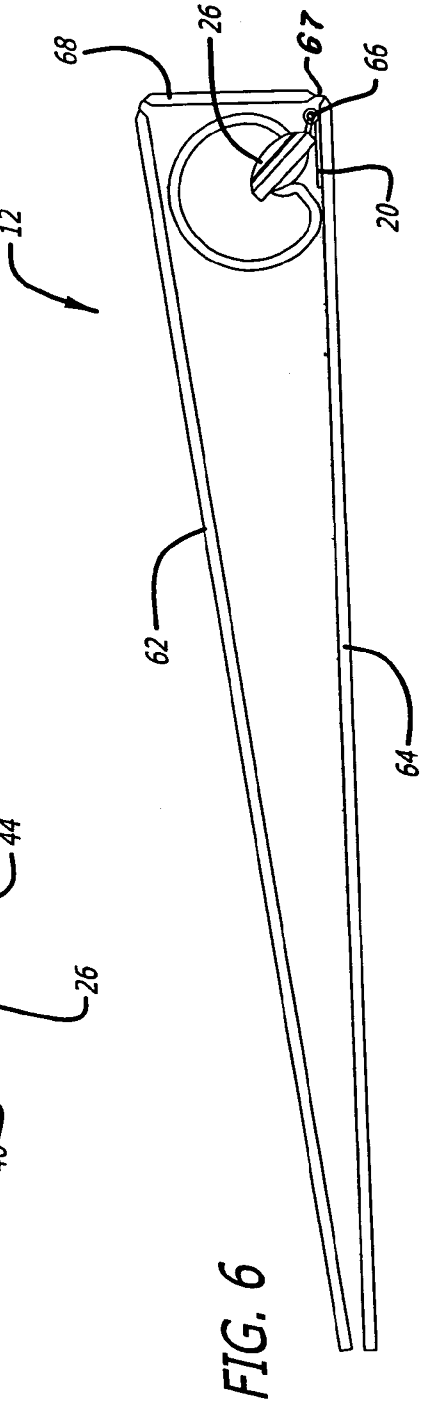
FIG. 6 is a side view showing the mounting of the ring assembly and hinge plate in a notebook.

FIG. 6 is a side view of an assembled notebook, with a front cover 62 and a rear cover 64. The hinge plate 20 is secured to the rear cover 64 but with the pivot line 66 between the hinge plate 20 and the shield 26 located near the pivot line 67 between rear cover 64 and the spine panel 68. With this configuration, when the front cover 62 is opened, the shield 26 is more prominent than the rear, or frame side of the ring assembly. The hinge plate could also be mounted on the spine panel and still maintain substantially the same location of the ring assembly hinge line.

Figure 7:
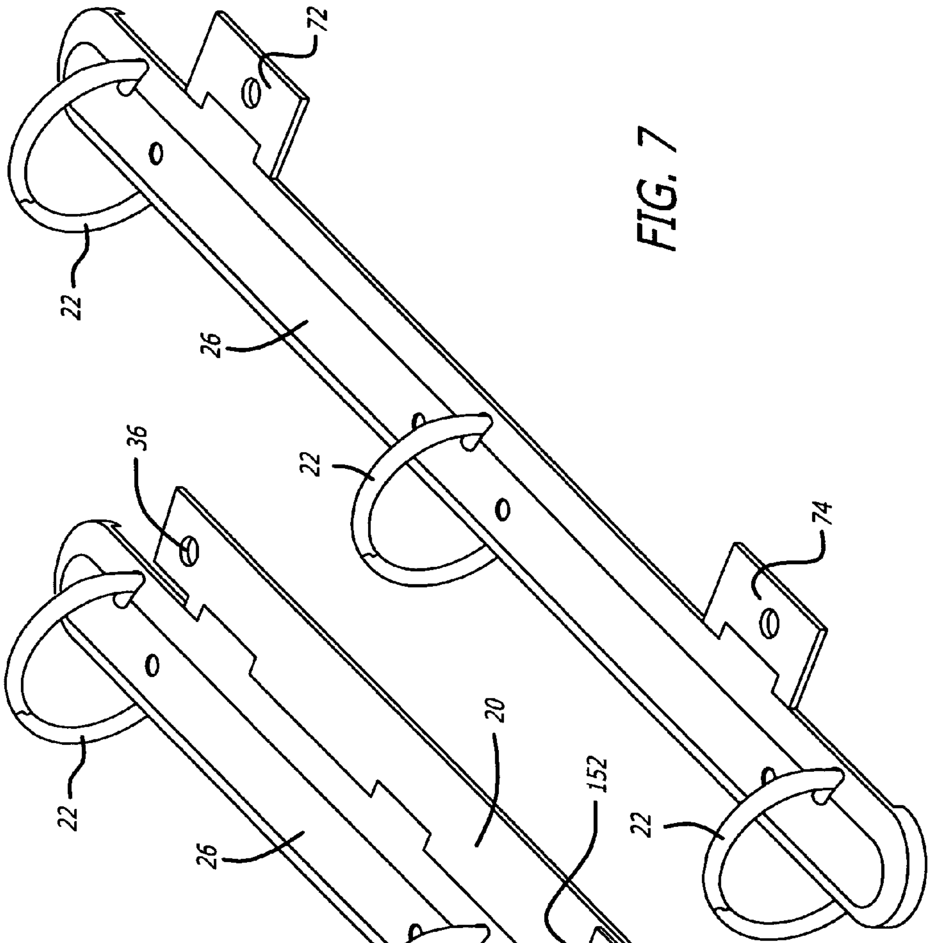
FIG. 7 illustrates an alternative embodiment employing two short hinge plates, instead of a single long hinge plate.

FIG. 7 shows a further embodiment, in which two small hinge plates 72 and 74 are provided in place of the hinge plate 20 shown in other figures of the drawings. The location of the pivot axis in FIG. 7 is still substantially the same as in other figures of the drawing, with curls from the shield 26 mating with a curl from each of the two hinge plates 72 and 74.

Figure 8:
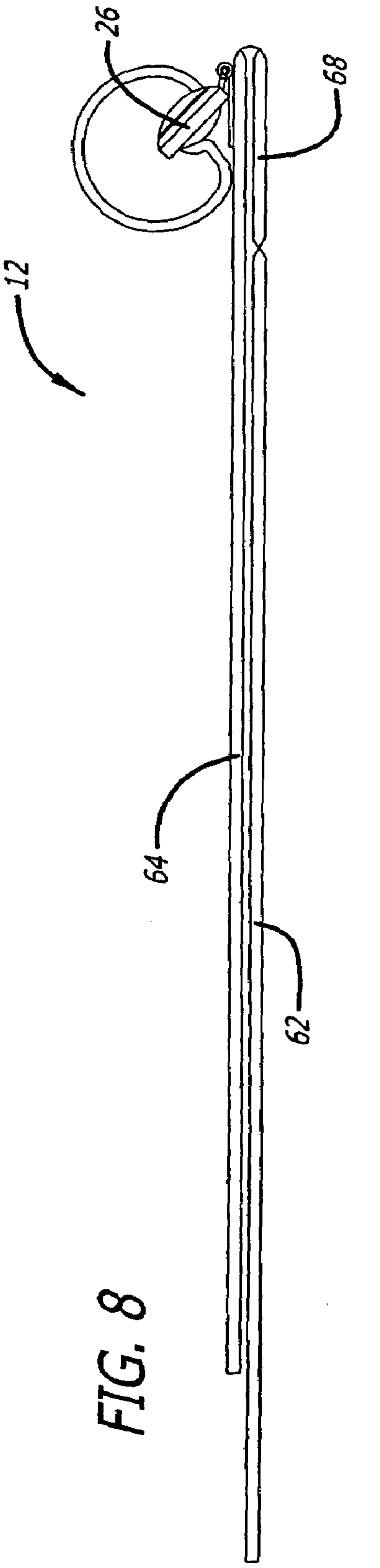
FIG. 8 shows the binder with the front cover and spine panel folded flat under the rear cover.

FIG. 8 shows the notebook 12 with the front cover 62 and spine panel 68 folded back. It may be noted that the notebook or binder 12 sits flat on an underlying surface so that it can be conveniently and stably mounted on a small surface such as a lectern or podium, for examples.

Figure 9:
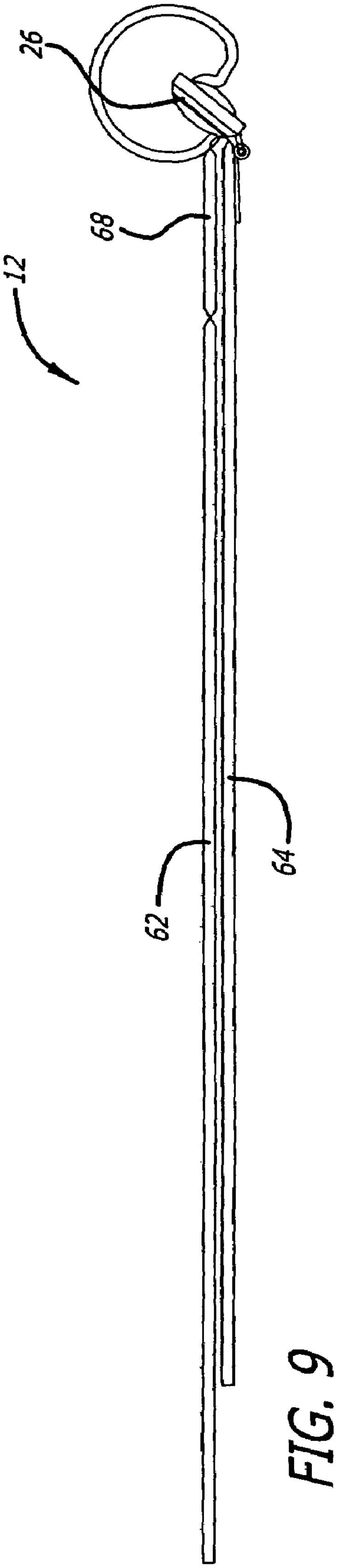
FIG. 9 is an end view showing the rear cover folded under the notebook which is configured to rest flat upon an underlying surface.

FIG. 9 shows another arrangement, in which the rear cover is folded under the front cover 62 and the spine panel 68, and the assembly still has the capability of lying flat on an underlying surface. Incidentally, these capabilities are facilitated by spacing the pivot between the shield and the hinge plate by a clearance distance 82 as shown in FIG. 3 and clearance distance 84 as shown in FIG. 4.

Concerning dimensions, for holding 8½×11-inch sheets, the dimensions of the covers of the binders would normally be approximately 9½ by 11½ inches. It is also noted that in the United States for 8½×11 inch size paper, the rings in three ring binders are normally spaced 4¼ inches apart, or with the outer rings about 8½ inches apart. For notebooks of this size, in one specific illustrative embodiment, the length of the ring assembly including the shields was slightly less than 9½ inches, and the rivet holes on the hinge plate or plates were spaced apart by about 7½ inches (7.562 inches). Thus, the length of the ring assembly including the curved shields may be substantially less than the 11½ inch height of the notebook, and may be ½ inch or 1 inch or more, less at each end of the ring assembly, relative to the notebook in which it is mounted. The foregoing dimensions are given by way of example and not of limitation. For A-4 paper and other size sheets the dimensions would be modified to implement the principles and constructions as discussed more generally in this specification.

As noted above, the foregoing paragraphs are taken from the related patent application cited above. The preferred embodiment of the present invention will now be set forth in the following detailed description.

Figure 10:
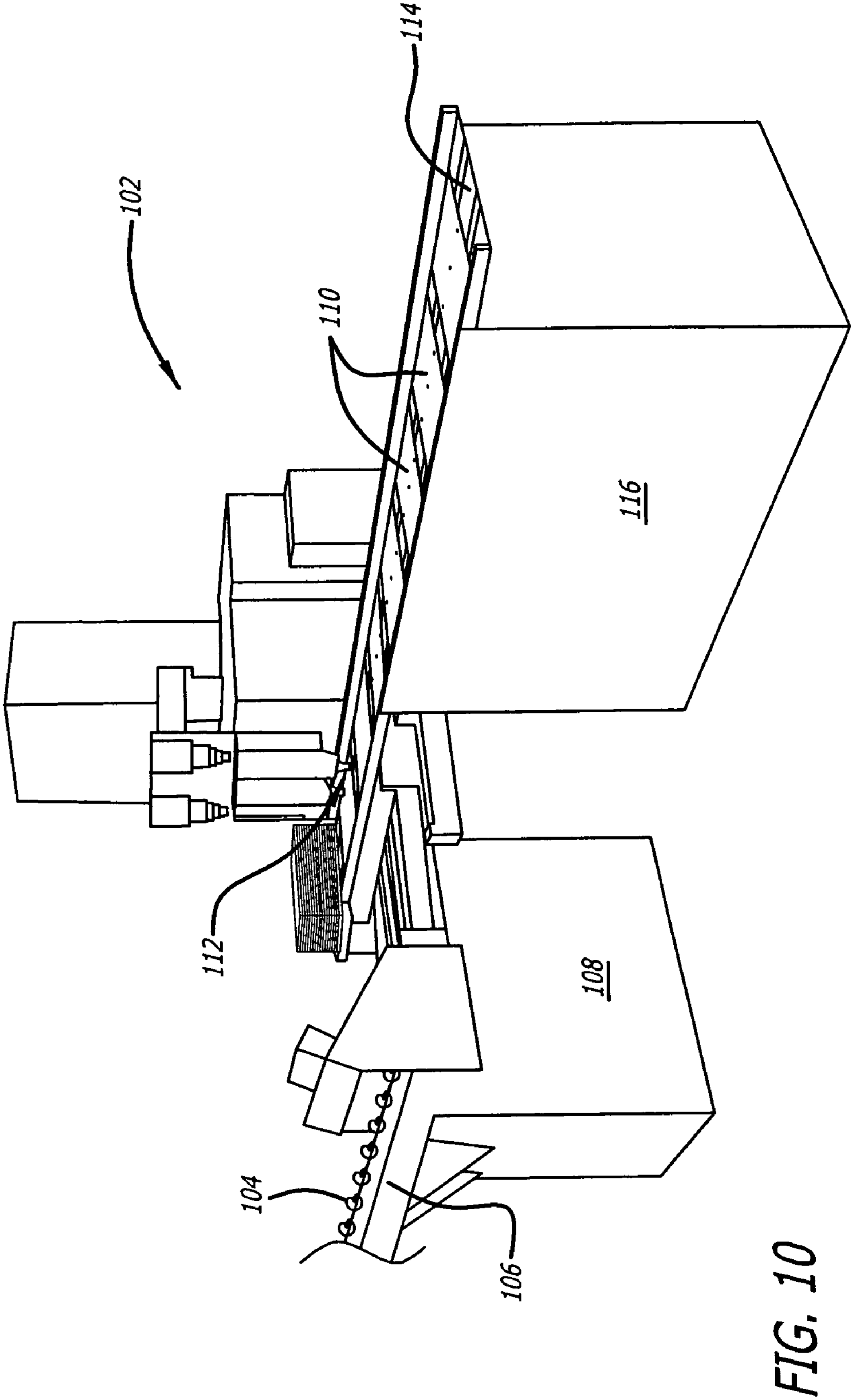
FIG. 10 is an overall view of a machine for riveting a wrap-around binder ring and hinge plate assembly to the binder covers.

Specifically, referring to FIG. 10 of the drawings, a riveting machine 102 is shown, with ring/hinge plate assemblies 104 being fed in on guide rails 106 mounted on base 108. Binder covers 110 are being fed in toward the riveting station 112 on a conveyor 114 mounted on base 116.

The basic riveting machine is available from Constantin Hang Maschinenfabrik, of Goeppingen, Germany.

Figure 11:
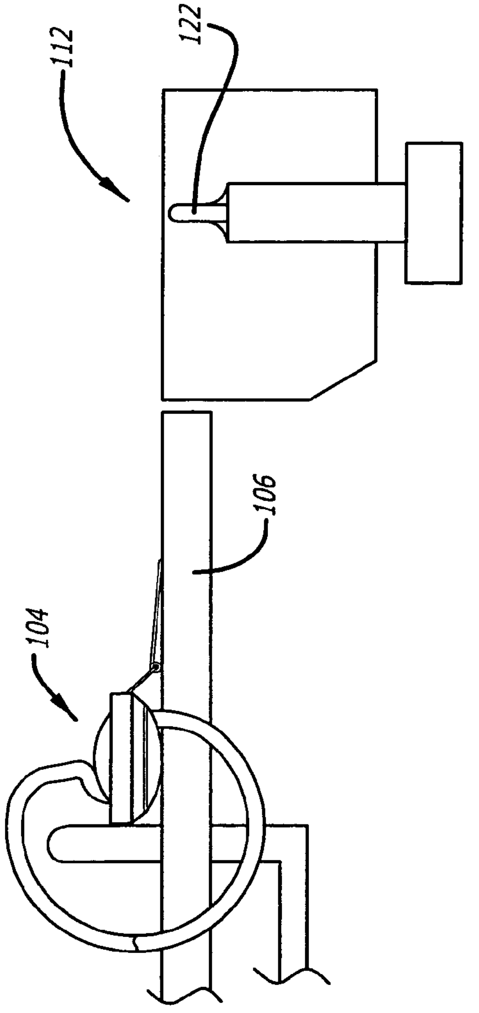
FIG. 11 shows the ring assembly and hinge plate being fed to the riveting station.

FIG. 11 is a schematic enlarged view of a ring/hinge plate assembly 104 being advanced along rails 106 toward the riveting station 112, with the guide and forming pin 122 being shown at the riveting station 112.

Figure 12:
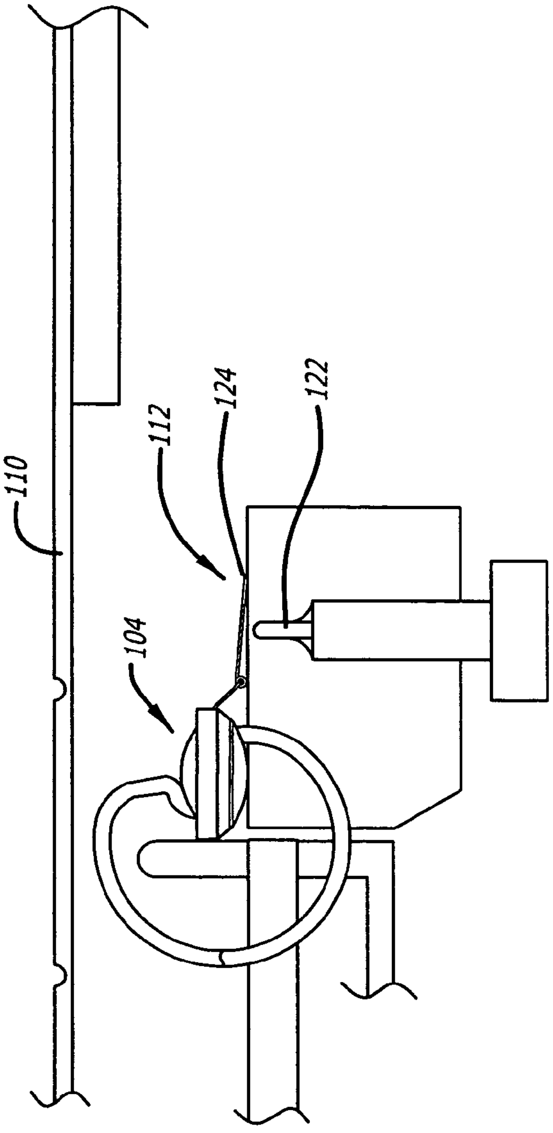
FIG. 12 shows the ring assembly at the riveting station, with the binder covers moved into position above the hinge plate.

In FIG. 12 the ring-hinge plate assembly has been advanced so that the hinge plate is at the riveting station 112. In addition, the binder cover and spine 110 has been advanced to the riveting station 112.

Figure 13:
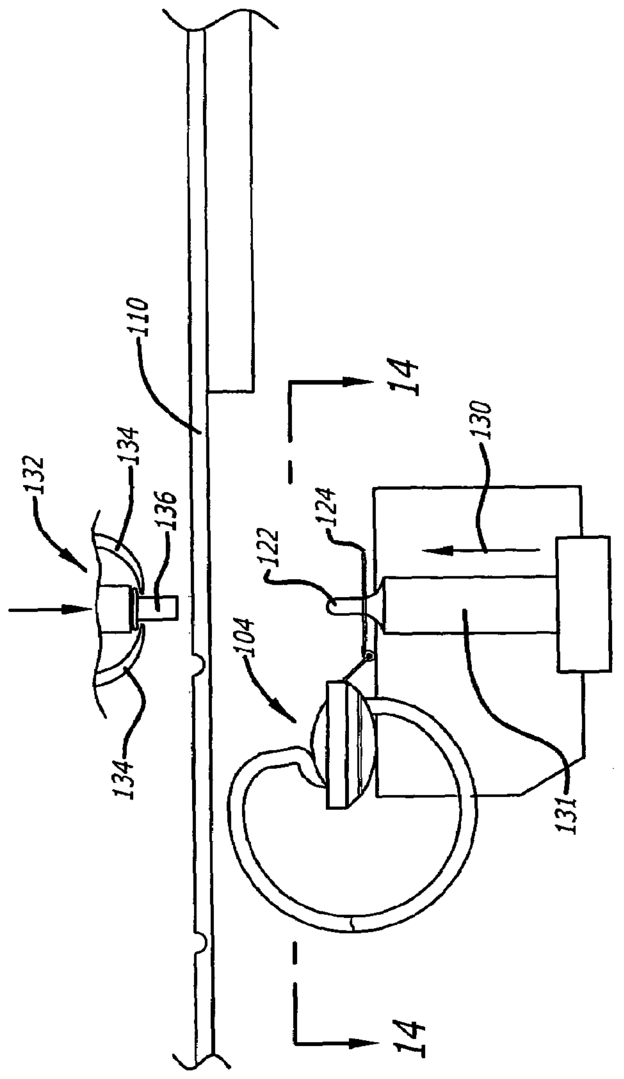
FIG. 13 shows the hinge plate being located positively by the rivet anvil pins.

FIG. 13 shows the next step, with the guide and forming pin 122 extending through one of the two openings in the hinge plate 124. As indicated by the arrow 130 the lower fixture 131, carrying the locating and forming pin 122 has been shifted upwardly to shift pin 122 upward through a hole in the hinge plate 124. Concurrently, another locating and forming pin is moved upward through a hole at the other end of the hinge plate 124. The upper portion 132 of the riveting apparatus is shown schematically in FIG. 13, with the fingers 134 holding the rivet 136 in place, waiting to be driven through the cover 110, and expanded on the lower side of hinge plate 124. Another rivet is also being positioned for riveting at the other end of the hinge plate 124.

Figure 14:
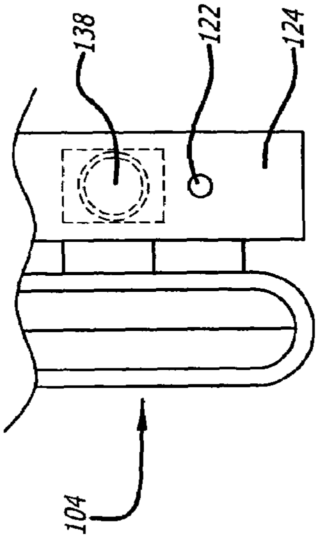
FIG. 14 is a fragmentary view taken along plane 14—14 of FIG. 13.

FIG. 14 is an enlarged fragmentary view taken along plane 14-14 of FIG. 13. In FIG. 14, the guide and forming pin 122 is extending through one of the holes in the hinge plate 124. In addition, a high strength permanent magnet 138 is shown in dashed lines mechanically linked to the pin 122. The magnet 138 underlies the hinge plate 124 and exerts a magnetic holding force onto the hinge plate 124, which is formed of magnetic material such as steel. Instead of a permanent magnet, an electromagnet may be employed to selectively hold and release the hinge plate 124.

Figure 15:
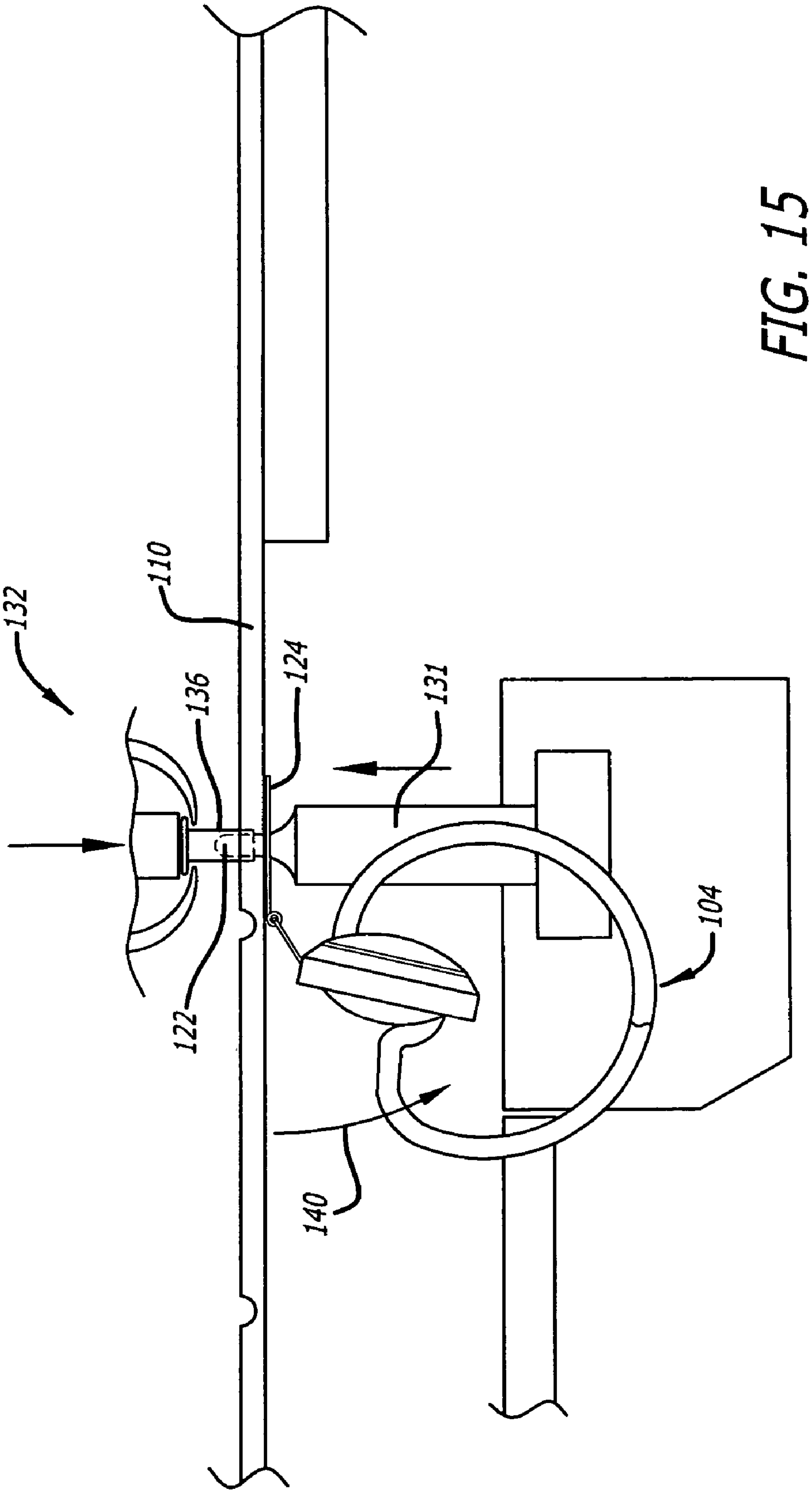
FIG. 15 shows the riveting operation by which the hinge plate is secured to the binder.

FIG. 15 shows the next step in the riveting process, with the rivet 136 being driven through the notebook cover 110 as the upper carriage 132 is advanced to force the rivet downward and the lower carriage 131 carrying the forming pin 122 is shifted upward. FIG. 15 is an intermediate view, with the rivet 136 subsequently being forced down further onto forming pin 122 and having the outer end of rivet 136 spread out on the lower side of hinge plate 124 to firmly secure the hinge plate 124 to the notebook covers 110. Incidentally, two rivets, one at each end of the hinge plate, are preferably deformed concurrently, to secure both ends of the hinge plate to the cover 110.

As the rivet 136 and pin 122 are brought together, the ring/shield/frame assembly 104 may swing down as indicated by arrow 140, to avoid interference with the notebook covers 110.

Figure 16:
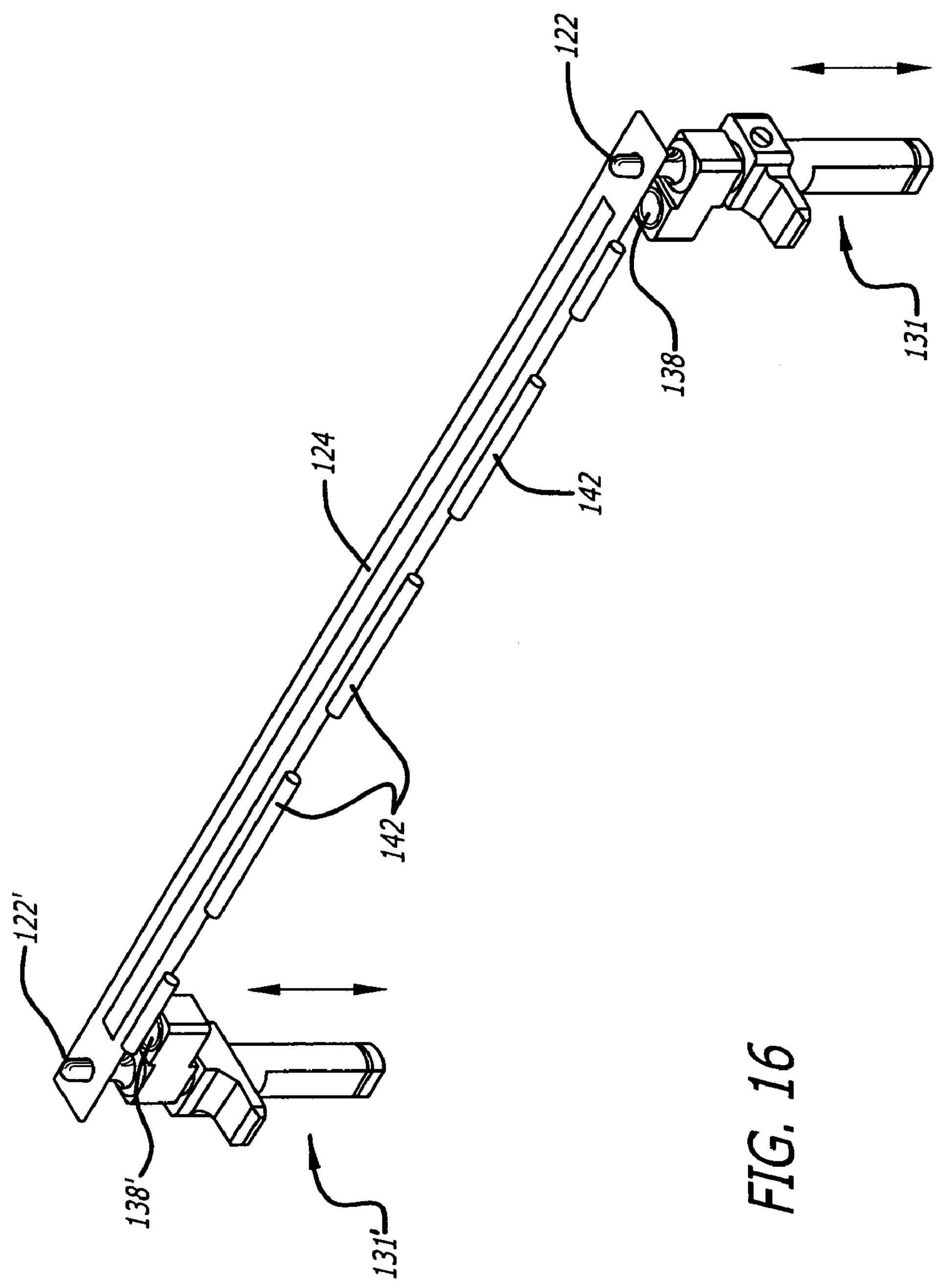
FIG. 16 is a perspective view of the hinge plate with the guide/forming pins extending through openings in the hinge plate.

FIG. 16 is a fragmentary perspective view of the hinge plate 124 and the pins 122 and 122' extending through the previously formed openings at each end of the hinge plate 124. In FIG. 16, the ring/shield/frame sub-assembly has been removed, but the hinge plate curls 142 indicating the pivot line between the hinge plate 124 and the ring/shield/frame sub-assembly, are shown. Also, magnets 138 and 138' associated with carriages 131 and 131' are shown in this perspective view.

Concerning another aspect of the riveting station using the Hang Maschinenfabrik riveter apparatus mentioned hereinabove, it is desirable that the hinge plate extend out substantially horizontally from the ring assembly. Accurate and consistent riveting of the hinge plate to the covers is facilitated by such horizontal orientation of the hinge plates.

When the hinge plate and ring assembly are oriented with the hinge plate leading, the hinge plate may be held stationary and horizontal by a short strip of pressure sensitive tape, as shown at reference numeral 152 in FIG. 2 of the drawings. Instead of the tape 152, the hinge plate may be held or fixed in the desired horizontal configuration by a rubber or plastic attachment or a cardboard retainer, or by any other convenient arrangement.

Figure 17:
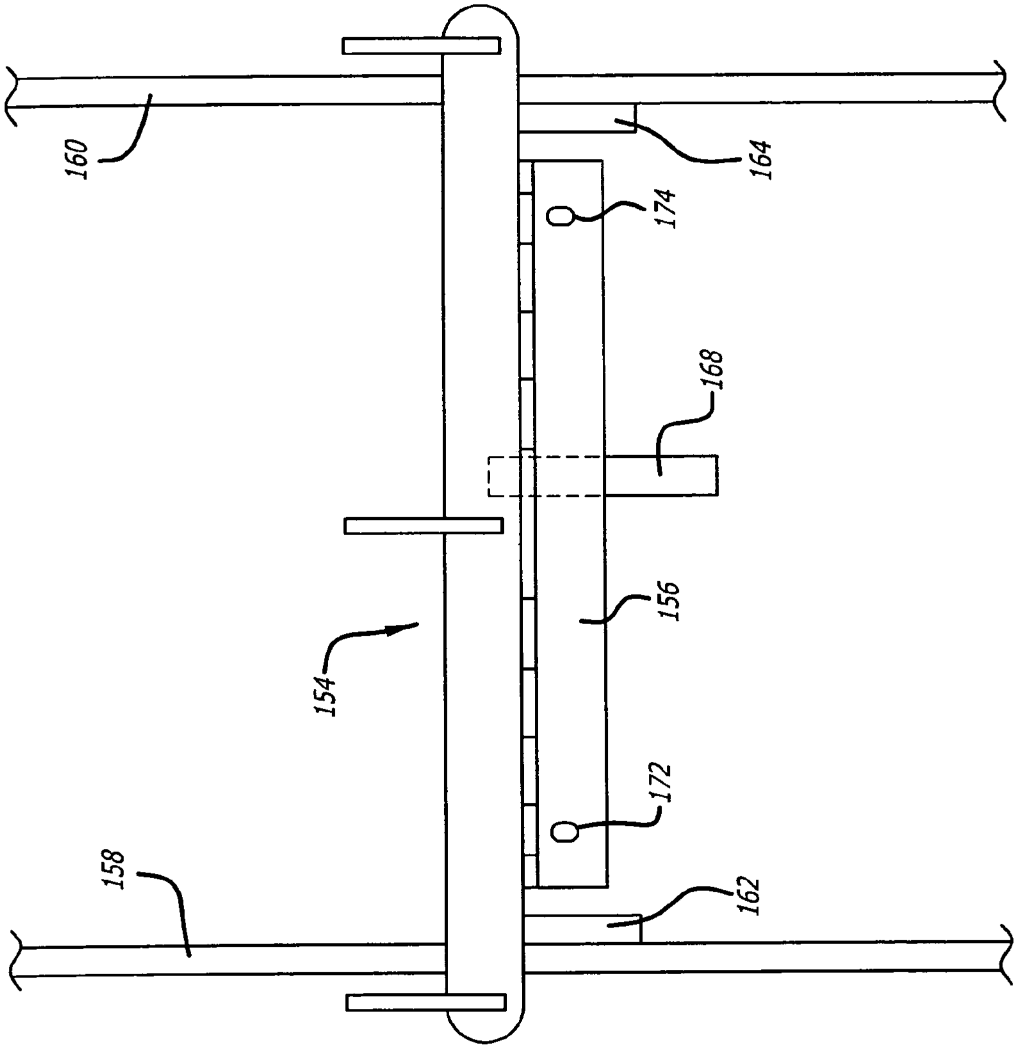
FIG. 17 is a diagrammatic showing of a ring and hinge plate assembly at the riveting station.

Alternatively, the hinge plates may trail the ring assembly, and one configuration to accommodate the hinge plate trailing mode of operation is diagrammatically shown in FIG. 17. In FIG. 17 the direction of travel into the riveting station is upward, with the ring assembly 154 leading the hinge plate 156. With this mode of operation, the hinge plate 156 is configured to be somewhat shorter than the ring assembly 154, which rides on the guide rails 158 and 160, and is incrementally advanced by the pushers 162 and 164. These pushers are controlled to follow a substantially rectangular path in a vertical plane, to advance the ring and hinge plate assemblies to the riveting station, and then move down and back to pick up the next assembly. With the shortened length of the hinge plate, interference with the pushers 162 and 164 is avoided. Prior to reaching the position shown in FIG. 17, the hinge plate depends from the ring assembly. However, a slanted guide fixture 168 is provided to swing the hinge plate up to the horizontal configuration as the assembly arrives at the riveting station. Incidentally, to accommodate slight variations in the position of the hinge plate, the holes 172 and 174 may be slightly oval or elongated in configuration.

In conclusion, in the foregoing detailed description, one illustrative embodiment of the invention has been shown. It is to be understood, however, that various alternatives and modifications may be employed without departing from the spirit and scope of the invention. Thus, by way of example and not of limitation, electromagnets may be employed in place of the permanent magnets to hold the hinge plate in place, and a single big magnet may be used instead of two small magnets. Regarding the riveting apparatus, instead of moving both the pins 122 and the rivets 136, one of them may be held fixed while the other is moved, with minor modifications of the fixtures and part holding and shifting arrangements. Also, other riveting machines may be employed and the parts fed in any desired manner, for example, by gravity feed or any desired conveyor arrangements. Accordingly, the present invention is not limited to the arrangements described in detail hereinabove.

What is claimed is:

1. A system for assembling a wrap-around binder or notebook comprising:

a plurality of ring/shield/frame sub-assemblies pivotally attached to associated hinge plates, and mounted for movement toward a riveting station;

a plurality of binder covers mounted for movement toward the riveting station;

each of said ring/shield/frame sub-assemblies having an outer surface, and each hinge plate being substantially aligned with the outer surface of a respective ring/shield/frame sub-assembly when the hinge plate is oriented parallel to a plane of a respective shield; and the hinge plates having at least two openings for receiving rivets;

a riveting apparatus for securing the hinge plates to the binder covers at the riveting station; the riveting apparatus comprising:

(a) locating and forming pins for extending through the openings in the hinge plates;

(b) at least one magnet in proximity to the pins for holding the hinge plates during riveting;

(c) the riveting apparatus including arrangements for holding rivets, and for driving the rivets through the covers, through openings in the hinge plates, and for expanding the rivets on the pins to secure the hinge plates to the covers.

2. A system as defined in claim 1 wherein the riveting apparatus includes arrangements for shifting the pins upward through the hinge plate holes and into forming engagement with the rivets which are driven downward.

3. A system as defined in claim 1 wherein the riveting apparatus provides clearance for the ring/shield/frame sub-assemblies to pivot downward as the rivets are expanded to secure the hinge plates to the covers.

4. A system as defined in claim 1 wherein the magnet is a permanent magnet.

5. A system as defined in claim 1 wherein a plurality of magnets are provided, and a movable carriage is provided, with the pins and magnets being mounted on the carriage.

6. A system for assembling a wrap-around binder or notebook as defined in claim 1 further comprising:

arrangements for holding a hinge plate at a pre-determined orientation relative to a respective ring sub-assembly at the riveting apparatus.

7. A system as defined in claim 1 wherein said hinge plates are substantially shorter than said ring/shield/frame sub-assemblies, and wherein said riveting apparatus includes pusher members for engaging the ring/shield/frame sub-assemblies at the ends thereof to advance ring and hinge plate assemblies into the riveting station without interference by the hinge plates.

8. A system as defined in claim 1 wherein the hinge plate openings are elongated in configuration.

9. A system for assembling a notebook or binder comprising:

a riveting apparatus including a riveting station; a plurality of binder covers mounted for movement toward the riveting station;

a plurality of ring assemblies mounted for feeding toward said riveting station; the ring assemblies including openings for receiving rivets;

the riveting station including locating and forming pins for extending through the openings in the ring assemblies;

at least one magnet mounted at the riveting station for holding the ring assemblies during a riveting operation; and the riveting apparatus further including arrangements for holding rivets, and for driving the rivets through the covers, through the openings in the ring assemblies and for expanding the rivets to hold the ring assemblies to the covers.

10. A system as defined in claim 9 wherein the riveting apparatus includes arrangements for shifting the pins upward through hinge plate holes and into forming engagement with the rivets which are driven downward.

11. A system as defined in claim 9 wherein the magnet is a permanent magnet.

12. A system as defined in claim 9 wherein a plurality of magnets are provided, and a movable carriage is provided, with the pins and magnets being mounted on the carriage.

13. A system for assembling a wrap-around binder or notebook comprising:

a plurality of ring/shield/frame sub-assemblies pivotally attached to associated hinge plates, the hinge plates having at least two openings for receiving rivets;

a plurality of binder covers;

locating and forming pins for extending through the openings in the hinge plates;

at least one magnet for holding the hinge plates during riveting; and a riveting machine including arrangements for holding rivets, and for driving the rivets through the covers, through openings in the hinge plates, and for expanding the rivets on the pins to secure the hinge plates to the covers.

14. A system for assembling a wrap-around binder or notebook as defined in claim 13 further comprising:

arrangements for holding the hinge plate at a pre-determined orientation relative to a corresponding ring sub-assemblies at the riveting apparatus.

15. A system as defined in claim 13 wherein said hinge plates are substantially shorter than said ring/shield/frame sub-assemblies, and wherein said riveting apparatus includes pusher members for engaging the ring/shield/frame sub-assemblies at the ends thereof to advance ring and hinge plate assemblies into the riveting station without interference by the hinge plates.

16. A system as defined in claim 13 wherein the hinge plate openings are elongated in configuration.

17. A system as defined in claim 13 wherein a plurality of magnets are provided, and a movable carriage is provided, with said pins and magnets being mounted on the carriage.

18. A system for assembling a wrap-around binder or notebook comprising:

a riveting station;

a plurality of ring/shield/frame sub-assemblies pivotally attached to associated hinge plates to form a ring assembly;

the hinge plates having at least two openings for receiving rivets;

a plurality of binder covers;

means for feeding the binder covers to said riveting station;

means for feeding ring assemblies to said riveting station;

locating and forming pins at the riveting station for extending through the openings in the hinge plates; at least one magnet for holding the hinge plates during riveting; and the riveting station including means for holding rivets, and for driving the rivets through the covers, through openings in the hinge plates, and for expanding the rivets on the pins to secure the hinge plates to the covers.

19. A system as defined in claim 18 wherein a plurality of magnets are provided, and a movable carriage is provided, with the pins and magnets being mounted on the carriage.

20. A system for assembling a wrap-around binder or notebook as defined in claim 18 further comprising:

arrangements for holding a hinge plate at a pre-determined orientation relative to a respective ring sub-assembly at the riveting apparatus.

21. A system as defined in claim 18 wherein said hinge plates are substantially shorter than said ring/shield/frame sub-assemblies, and wherein said riveting apparatus includes pusher members for engaging the ring/shield/frame sub-assemblies at ends thereof to advance ring and hinge plate assemblies into the riveting station without interference by the hinge plates.

* * * * *